US006143982A

United States Patent [19]

Gretz

[11] Patent Number: 6,143,982

[45] Date of Patent: Nov. 7, 2000

[54] EASY-INSERTION C-SHAPED CONNECTOR

[75] Inventor: Thomas J. Gretz, Clarks Summit, Pa.

[73] Assignee: Arlington Industries, Inc., Scranton, Pa.

[21] Appl. No.: 09/200,639

[22] Filed: Nov. 25, 1998

[51] Int. Cl.[7] ........................................ H02G 3/18

[52] U.S. Cl. ........................................ 174/65 R; 248/56

[58] Field of Search ........................ 174/65 R, 65 G, 174/151, 152 G, 135; 248/56; D13/24; 285/162; 16/2.1, 2.2

[56] References Cited

U.S. PATENT DOCUMENTS

| | | | |
|---|---|---|---|
| D. 251,781 | 5/1979 | Hutton | D13/24 |
| 2,527,227 | 10/1950 | Namet | 174/65 R X |
| 2,706,647 | 4/1955 | Gillespie | 285/162 |
| 4,192,477 | 3/1980 | Decky et al. | 248/56 |
| 5,374,017 | 12/1994 | Martin et al. | 248/56 |
| 5,442,141 | 8/1995 | Gretz | 174/65 G X |
| 5,693,910 | 12/1997 | Gretz | 174/65 G |

*Primary Examiner*—Dean A. Reichard

[57] ABSTRACT

This invention relates to electrical connectors, specifically to an electrical connector that is easy to insert into a hole or knock-out of an electrical junction box. Design of the connector provides for positive fixture of the connector in the box once non-metallic sheathed cable, either oval or circular in cross-directional shape, is inserted through the connector, thus preventing the cable from being with drawn. The C-shaped one piece connector of this disclosure contains a double-radiused inner flange at the connection between an angled jaw support to provide for easy flexing about the central insertion axis and therefore easy insertion and locking into an electrical junction box. The jaws of the electrical connector are designed such that a positive bite or grip is applied to an oval or circular non-metallic sheathed cable as tension is applied on the cable to attempt to remove it from the electrical junction box.

1 Claim, 3 Drawing Sheets

EASY-INSERTION C-SHAPED CONNECTOR

This invention relates to electrical connectors, specifically to an electrical connector that is easy to insert into an electrical junction box. This particular invention relates to an improved C-shaped connector that facilitates easy flexing of the connector, thereby effectively reducing the outside diameter of the connector and allowing easy insertion into a hole or knock-out of a typical junction box.

BACKGROUND OF THE INVENTION

Typically, non-metallic sheathed cable is attached to electrical junction boxes by either of two general methods. The classical method of connecting said non-metallic sheathed cable to an electrical junction box is by inserting a circular, threaded metal connector through a hole or knockout in the junction box, mating the exposed end of the connector inside the box with a threaded flange, tightening the threaded flange against the connector and thus tightly to the wall of the junction box, inserting said non-metallic sheathed cable, orienting said cable in the proper orientation if it has an oval cross-directional shape, and then tightening two screws that draw together a bracket that is an integral part of said connector causing the bracket to draw together around said cable and lock it in place.

The second general method of attaching a non-metallic sheathed cable, either circular or oval in cross-directional shape, employs quick connect type fittings that are pushed into the hole in the junction box either prior to the insertion of said cable or are inserted after being affixed onto the cable with the connector and cable then inserted together.

This invention is an improvement over Applicant's prior U.S. Pat. No. 5,693,910, the contents of which are included herein by reference.

This disclosure thus improves aforementioned prior art by providing a simple, one-piece moldable electrical connector that is flexible enough in its design to allow easy one hand insertion in the knock-out of a junction box while also providing one-way restraint of the cable at the junction box wall to prevent forceful removal therefrom.

SUMMARY OF THE INVENTION

This invention relates to electrical connectors, specifically to an electrical connector that is easy to insert in a hole or knock-out of an electrical junction box. The connector can easily be inserted with one hand by applying a slight squeezing pressure to the outer diameter of the connector.

Once the connector of this disclosure is inserted into the junction box and finger pressure is related, the connector springs back or nearly back to its original diameter, thereby holding the connector in the box. Non-metallic sheathed cable, either circular or oval in cross-sectional shape, can then be inserted through the connector to be desired position. The connector contains jaws that are designed such that a positive yet non-abrasive bite or grip is applied on said cable when tension is applied to it in an attempt to remove it from said enclosure. Once inserted, the cable is therefore restrained by the connector and is held firmly in the junction box.

The invention is especially useable with ¾ inch trade-size knock-outs of electrical boxes. The part of the connector that goes inside the electrical box has two rocker arms or gripper jaws/angled support which are flexible by virtue of the flexibility of the plastic. When a large round cable is pushed into the connector it expands the rocker arms and centering jaws in all four directions to both better lock the connector in the knock-out opening and grip the round cable. It can also be used for smaller cables, stacked oval cables, etc., as long as the cables are prevented from easy removal.

The shape of the two rocker arms is very important as the double-radiused inner flange is first rotated toward the base flange to help lock the connector in the electrical box opening. At that point, the inner flange no longer rotates and the further movement of the rocker arm outward causes an increase from the bending resiliency of the plastic to lock the cable in position.

The locking or holding of the cable is assisted by two y-shaped guide jaws that bridge the space at the end of the gripper jaws. These guide or centering jaws are opened up by larger cable and help both center and hold the cable in position.

DESCRIPTION OF THE INVENTION

The figures are intended to illustrate an easy insertion connector for connecting non-metallic sheathed cable to electrical junction boxes.

Figure 2:
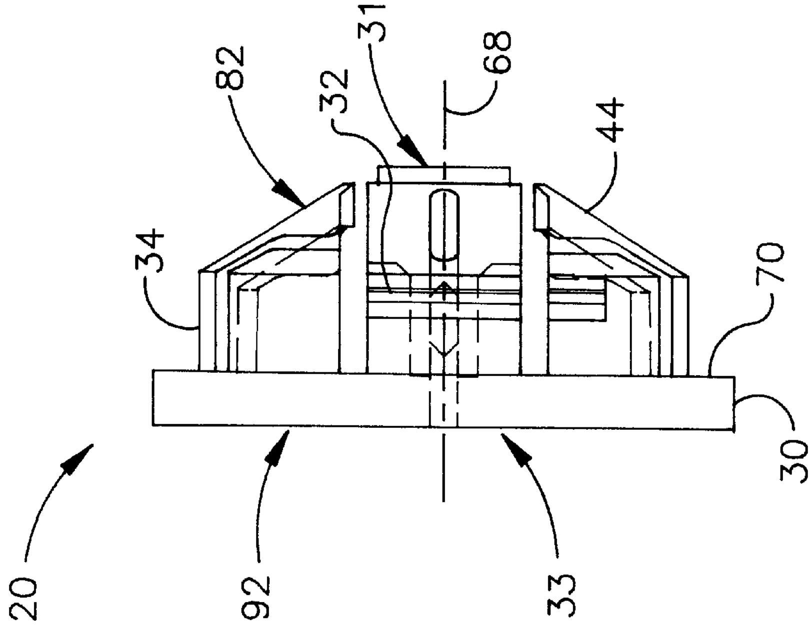
FIG. 2 is a side view of the view shown in FIG. 1.
Figure 1:
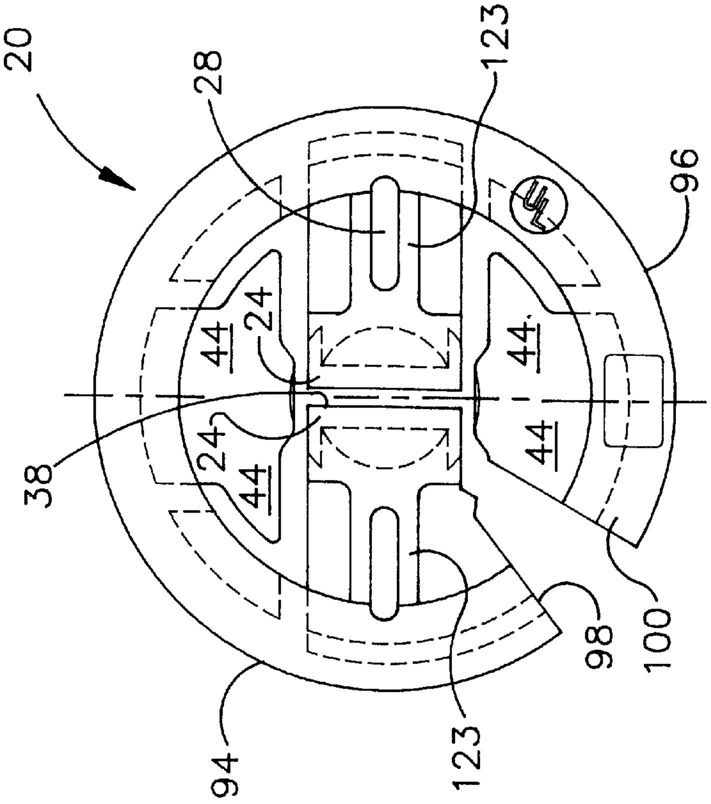
FIG. 1 is an end view as viewed from the outboard end.

The connector of this invention, indicated by reference numeral 20 in FIG. 1, is a one-piece C-shaped connector having a hollow body of resilient flexible material with an outboard end 92 and an inboard end with a passage way therethrough. The connector has two gripper jaws 24 that are spaced equidistant around central axis 68 with an outer conical surface 82 the arrangement and design of which provide easy centering of said connector 20 in an appropriate knock-out in an electrical junction box from.

The seat 34 is the portion of connector 20 that will be in intimate contact with the wall or panel of a junction box when connector 20 is affixed thereto. The base flange 30 has a diameter greater than the opening in the panel and is formed of two arcuate parts 94 and 96 with each part having a first facing and 98 and a second facing end 100.

The notch 22 works in conjunction with a second feature of the connector of this disclosure which is the cut out 72. The combined action of the notch 22 and cut out 72 permit easy flexing of connector 20, causing the opposing edges of the cutout to close together. The opposing edges of said cutout 72 are formed with a straight edge 50 and an angled edge 48, allowing the opposing surfaces to close together without structurally weakening said connector 20. Straight edge 50 will close toward angled edge 48 until they contact at mating point 54. By having angled age 48, the connector is thus prevented from over collapsing as pressure is applied to its outer circumference.

The gripper jaws 24 are each supported by an angled support 29 having an inboard end 31 an outboard end 33. Each angled support 20 contains a slot 28 that adds flexibility to the gripper jaws 24 and angled support 29 when a cable is being inserted through the connector 20. The slot allows the gripper jaws 24 to flex outwardly to accommodate the cable, while still allowing enough stiffness for gripper jaw 24 to apply a strong restraining grip when tension is applied in an attempt to remove said cable from said junction box. The angle of the support 29 is formed as part of the outer, conical surface 82.

Figure 5:
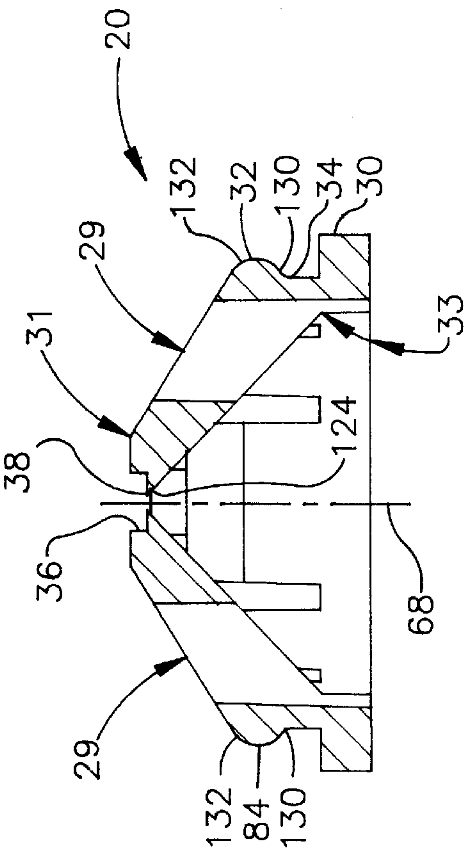
FIG. 5 is a cross-sectional view along section 5—5 of FIG. 3.

The edges of the gripper jaws 24, as depicted in the cross-sectional view shown in FIG. 5 are designed with an indented edge 36. The gripper jaws 24 typically spread apart when non-metallic shielded cable is inserted along central axis 68 with the cable contacting the underside of the angled support 29. After the cable is inserted as far as desired, tension may be applied to the cable in the opposite direction, or away from the box. This action causes the gripper edge 38 to bite into the cable and lock it in place. The bite or grip caused by gripper edge 38 of gripper jaws 24 is non-abrasive as a result of the resilient material of construction of connector 20, and does not tear, abrade, or puncture the shield of said cable. The cable is however securely locked inside the junction box by this action.

Figure 4:
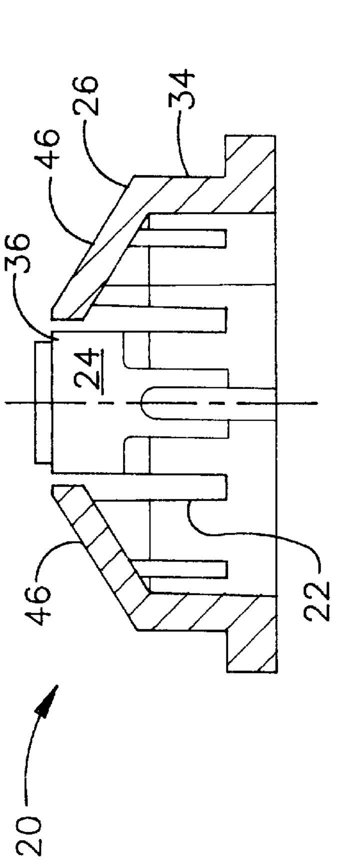
FIG. 4 is a cross-sectional view along section 4—4 of FIG. 3.

As depicted in FIG. 4, a cross sectional view of the centering jaws 44 show angled surface 46 interior of connector wall 26. In operation, as a cable is pushed through connector 20, centering jaws 44 function to provide centering of the cable, while not impeding its passage. This may be a rough centering action, depending on the gauge of the cable being inserted, as some gauges will not extend entirely from one centering jaw 44 to the other and in this case one center in job 44 acts to push the cable farther toward the central axis 68. The cable, whether circular are oval in cross sectional shape, does not have to be exactly centered in order for the invention to perform its task of locking the cable and place.

The centering or guide jaws are very important with larger circular cable as they are pushed outward against their own resiliency to both hold and lock the cable in position. As seen in FIG. 1, the centering jaws are y-shaped although one is only partly y-shaped. They are both flared out in a direction perpendicular to the gripper jaw opening 124 with outboard wings 126 and two flat edges 128 that bridge the opening 124.

The connector 20 when fully installed in the knock-out of a typical junction box wall is typically inserted until base flange 30 contacts the outboard junction box wall at the abutment edge 70. The seat 34 of connector 20 rests on the surrounding junction box wall. After insertion, abutment edge 70 is flush with the outboard surface of the junction box wall and top flange 32 with double radiused lip 84 may or may not be contacting the inboard surface of the junction box wall depending on the wall thickness of the box. The seat 34 is approximately the same diameter as the opening in the panel of the box and is of a width equal to or greater than the thickness of the panel.

The connector 20 is therefore adaptable to several different wall thicknesses and to several different gauges of non-metallic sheathed cable. Once tension is applied to a non-metallic sheathed cable in an attempt to pull it out of the box, base flange 30 may be pulled slightly away from exterior surface, but only as far as the rounded lip 84 of top flange 32 will allow. Reverse tension does not have to be applied to cable to make the connector 20 secure in the junction box, but if reverse tension is ever applied to the cable, it will be positively restrained once double radiused lip 84 contacts the interior surface interior of the junction box. Therefore the cable is essentially secure after insertion and does not require reversed tension to be applied to make it so.

Figure 3:
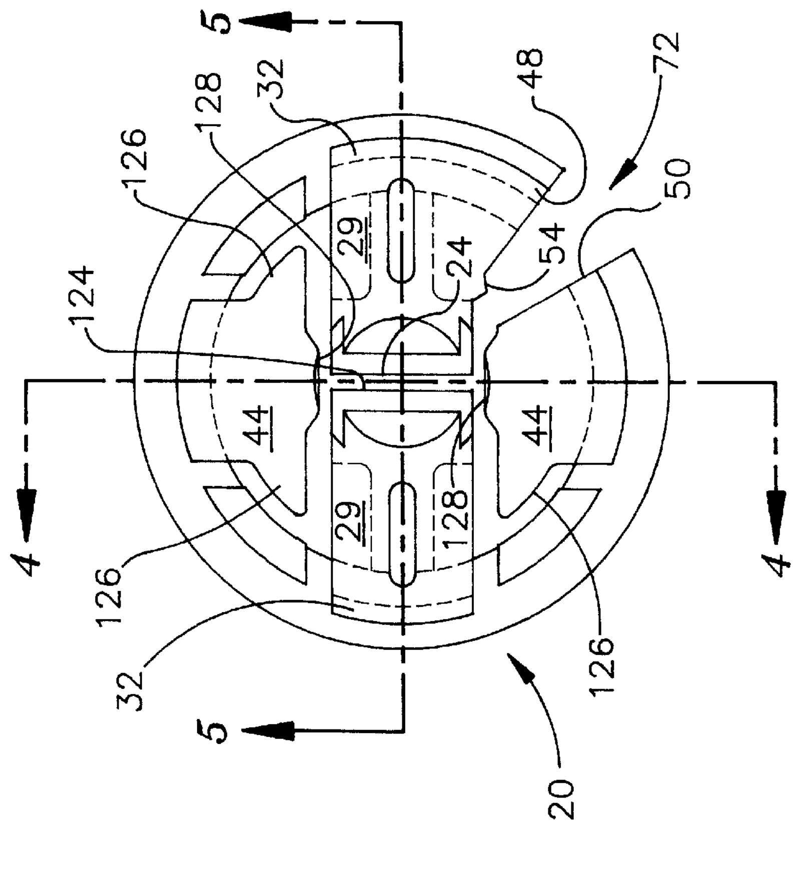
FIG. 3 is an end view as viewed from the inboard end of the connector.
Figure 7:
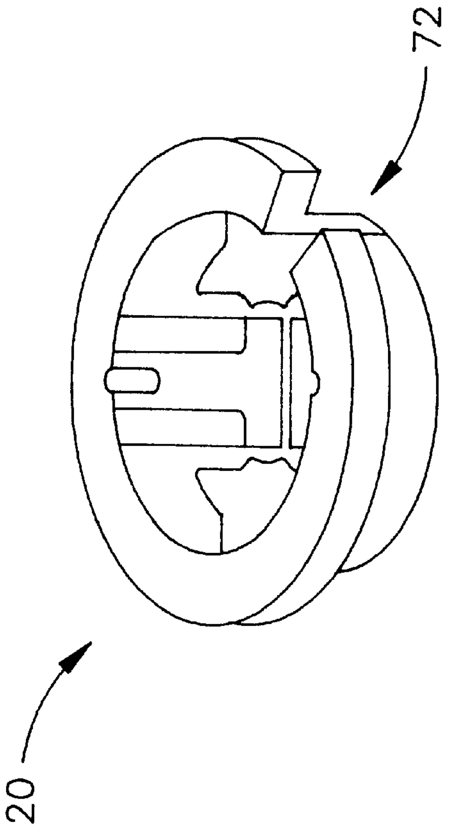
FIG. 7 is a schematic isometric view of the connector as viewed from the outboard end.
Figure 6:
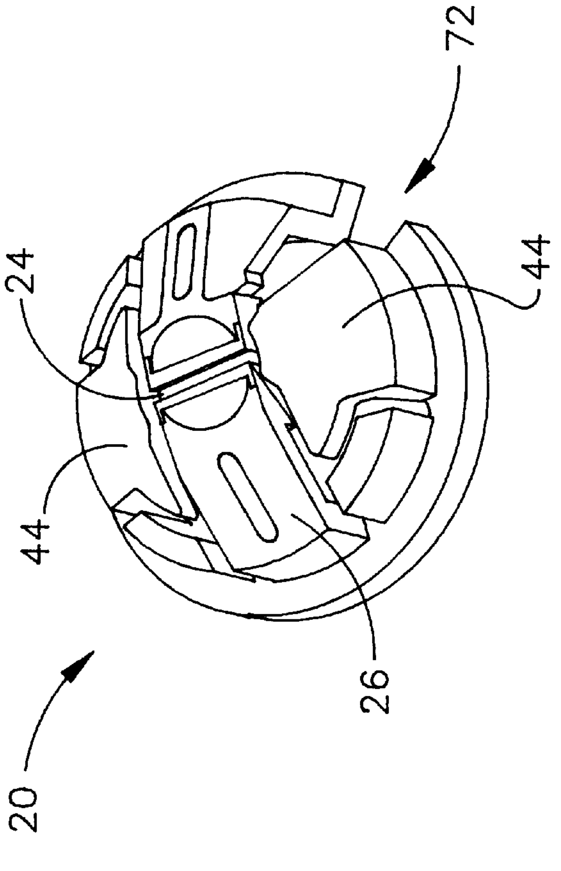
FIG. 6 is a schematic isometric view of the connector as viewed from the inboard end.

The shape of the inner flange 32 is very important. As best seen in FIGS. 3 and 5, the inner flange is at the outer end of the angled support 29 and defines one wall of the seat 34 with the other wall being the base flange 30. The width of seat 34 is approximately 0.088 inches. The rounded inner flange 32 in cross-section has a first radius 130 of approximately 0.030 inches and a second larger radius 132 that is approximately 0.062 inches. When a cable is inserted into the connector it causes the gripper jaws 24 and angled support 52 to be spread apart which causes a rotation Howard and the inner flange 32 rotates toward the base flange 30 to lock the thickness of the electrical box between them. Further insertion of the cable causes the gripper jaws and angled support to flex outward to further grip the cable against withdrawal.

The side walls of the gripper jaws and angled support are substantially perpendicular to the transverse straight faces all the way to the base flange 30. The three notches 22 extends to the inner flange 32 and the seat 34 terminating at said base flange 30.

Each angled support includes a slot or elongated hole 28 which extends into a slot extension 121 that partially penetrates the connector's wall and extends to the end of the outboard end. Each side of the slot 28 is stiffening flange 123.

The gripper jaws 24 and angled support are cantilevered from the base flange which increases their flexibility for insertion of wire but still retains adequate resistance to the wires being withdrawn.

The above descriptions given to satisfy the requirements for disclosure of the invention and are not to be construed as limiting the scope of the invention insofar as a person skilled in the art can modify aspects of the disclosure. The scope of the invention is to be construed as limited only by the appended claims and their equivalents.

What is claimed is:

1. A one-piece, C-shaped connector for connecting an electric cable through an opening in a panel, said opening having a thickness, said connector comprising:

(a) a hollow one piece C-shaped round body of resiliently flexible material having an outboard end, an inboard end, a wall and a passageway surrounded by said wall extending from said outboard end to said inboard end for enclosing the cable;

(b) two opposed gripper jaws having transverse faces with an opening therebetween at said inboard end of said body for gripping said cable;

(c) a full opening in said wall extending from said outboard end to said inboard end with sufficient width to permit said wall to be circumferentially collapsed sufficiently to permit the inboard end of said body to be inserted into said opening in said panel;

(d) an angled support having an inboard end and an outboard end for each of said gripper jaws, with each of said gripper jaws integrally attached at said inboard end of a corresponding one of said angled supports;

(e) said gripper jaws and angled supports having sides which are approximately perpendicular to said faces of said gripper jaws;

(f) an opening in said wall adjacent to each of said sides of each of said gripper jaws and angled supports for a total of four openings, with one of said openings being said full opening and the other of said three openings being partial openings;

(g) a base flange located at said outboard end of said body and having a diameter greater than the diameter of the opening in the panel;

(h) a seat in said outboard end of said body of approximately the same diameter as the diameter of said opening in said panel and having a width equal to or greater than said thickness of said opening in said panel, said seat having an outboard abutment edge located on an inner said of said base flange;

(i) an inner rounded flange located on an inboard side of said seat with said inner flange being integrally attached to said seat; and (j) two centering jaws which increase to flat ends located so that said flat ends extend approximately parallel to said sides of said gripper jaws and are of a width greater than and bridging said opening between said gripper jaws.

* * * * *